United States Patent [19]

Kamimura et al.

[11] Patent Number: 5,063,512
[45] Date of Patent: Nov. 5, 1991

[54] CONTROL UNIT OF ACTIVE SUSPENSION SYSTEM OF VEHICLE

[75] Inventors: Katsuyoshi Kamimura, Tochigi; Atsushi Mine; Yutaka Hiwatashi, both of Gunma, all of Japan

[73] Assignee: Fuji Jukogyo Kabushiki Kaisha, Tokyo, Japan

[21] Appl. No.: 410,843

[22] Filed: Sep. 22, 1989

[30] Foreign Application Priority Data

Sep. 30, 1988 [JP] Japan .................. 63-246241

[51] Int. Cl.$^5$ .............................. B60G 17/01
[52] U.S. Cl. ................. 364/424.05; 280/707; 280/703
[58] Field of Search ............... 280/707, DIG. 1, 840, 280/6.12, 702, 703; 364/424.05

[56] References Cited

U.S. PATENT DOCUMENTS

| | | | |
|---|---|---|---|
| 3,124,368 | 3/1964 | Corley et al. | 280/707 |
| 4,575,115 | 3/1986 | Tatemoto et al. | 280/707 |
| 4,610,462 | 9/1986 | Kumaga et al. | 280/707 |
| 4,697,237 | 9/1987 | Tanaka et al. | 280/707 |
| 4,846,496 | 7/1989 | Tanaka et al. | 280/707 |
| 4,911,469 | 3/1990 | Kawarasaki | 280/DIG. 1 |

FOREIGN PATENT DOCUMENTS

| | | | |
|---|---|---|---|
| 62-29409 | 2/1987 | Japan | 280/707 |
| 62-139709 | 6/1987 | Japan | |
| 62-251222 | 11/1987 | Japan | 280/707 |

Primary Examiner—Kenneth R. Rice
Assistant Examiner—Karin Tyson
Attorney, Agent, or Firm—Beveridge, DeGrandi & Weilacher

[57] ABSTRACT

A control unit for an active suspension system of a vehicle. The control unit includes a longitudinal g sensor for sensing longitudinal g of the vehicle body to generate a longitudinal g signal; and a control instruction quantity calculating circuit for calculating a control instruction quantity of a fluid to be charged into or discharged from each of suspension units in response to the longitudinal g signal to generate and transmit a control instruction quantity signal representing the control instruction quantity to a fluid charge and discharge control circuit for controlling to charge into or discharge from each suspension unit, whereby the vehicle body is controlled in response to the longitudinal g so that the vehicle body is effectively held in an ordinary position.

9 Claims, 4 Drawing Sheets

CONTROL UNIT OF ACTIVE SUSPENSION SYSTEM OF VEHICLE

The present invention relates to a control unit of an active suspension system of a vehicle, particularly to a motor vehicle.

The inventors have developed an active suspension system of a vehicle, using air springs, which is disclosed in Japanese Patent Laid-open Publication No. 62(1987)-129709. The active suspension system is provided with a vertical acceleration sensor for sensing a vertical acceleration of the mass above each of four air suspensions and with a suspension stroke sensor for sensing a vertical relative displacement of the masses above and below each air suspension. The vertical acceleration of the mass sensed by each vertical acceleration sensor, and the vertical relative displacement sensed by each suspension stroke sensor are inputted into a controller. The controller calculates an air charge instruction flow quantity and an air discharge instruction flow quantity of each air suspension from the vertical acceleration, the vertical relative displacement and a vertical relative displacement velocity, which is obtained from the vertical relative displacement by operation. The controller controls a flow quantity control valve to separately and independently perform charging or discharging of air at the instruction flow quantity with respect to each of air suspensions whereby an apparent mass of the vehicle body, damping and spring effect may be controlled in variable with respect t each air suspension.

The active suspension system, as described above, provides a very soft riding comfort in response to an input such as a upward thrust load from a road surface and enables the vehicle to hold a normal position against a slow shift of a load on the vehicle.

When a longitudinal acceleration or a longitudinal g affects a vehicle body upon deceleration or acceleration thereof, a load shift in a fore and aft direction is however made due to the longitudinal g, resulting in such changing a position of the vehicle body in the pitching direction as a nose-dive and squat. The active suspension system of the prior art above described detects a change in position of the vehicle body by sensing a change in stroke of each suspension which results from the longitudinal g generated and controls the vehicle to return to the normal position according to signals, which represent the stroke change, from the corresponding suspension stroke sensor. This control tends to be delayed from generation of the longitudinal g. Particularly in case where a large longitudinal g affects the vehicle body, the control against the change in position of the vehicle body is considerably slow and exhibits a characteristic such that the vehicle body returns to the normal position after the position change thereof, thus raising a problem of insufficient control.

Accordingly, it is an object of the present invention to reducing such a disadvantage.

SUMMARY OF THE INVENTION

In view of this and other objects, the present invention provides a control unit for an active suspension system of a vehicle, the active suspension system having a plurality of suspension units adapted to corresponding wheels of the vehicle and supporting a vehicle body by pressure of a fluid, a vertical relative displacement sensing means for sensing the vertical relative displacement between masses above and below each suspension unit to generate a vertical relative displacement signal representing the vertical relative displacement, fluid charging and discharging means for selectively charging the fluid into and discharging the fluid from each suspension unit, first control instruction quantity calculating means for calculating first control instruction quantity of the fluid to be charged into and discharged from each suspension unit in response to the vertical relative displacement signal and for producing a first control instruction quantity signal representing the first control instruction quantity and fluid charge and discharge control means responsive to the first control instruction quantity for producing a control signal to the fluid charging and discharging means. The control unit comprises: longitudinal g sensing means for sensing longitudinal g of the vehicle body to generate a longitudinal g signal; second control instruction quantity calculating means for calculating a second control instruction quantity of the fluid to be charged into or discharged from each suspension unit in response to the longitudinal g signal and for producing a second control instruction quantity signal representing the second control instruction quantity ; and summing means responsive to the first and second control instruction quantity signal for adding the first control instruction quantity to the second control instruction quantity and for producing a total control instruction quantity to the fluid charge and discharge control means, whereby the vehicle body is controlled in response to the longitudinal g so that the vehicle body is effectively held in the ordinary position.

With such a system, the present invention achieves a highly accurate control of the position of a vehicle with a very small time lag as compared to the control unit of the prior art system irrespective of the type of the suspensions, the height of the vehicle, the magnitude and distribution of the braking force and the driving force, and the drive mode, particularly in case of the part-time four wheel drive vehicle.

BRIEF DESCRIPTION OF THE DRAWINGS

The present invention will now be described by way of example with reference to the drawings, in which.

DETAILED DESCRIPTION OF THE PREFERRED EMBODIMENT

Figure 1:
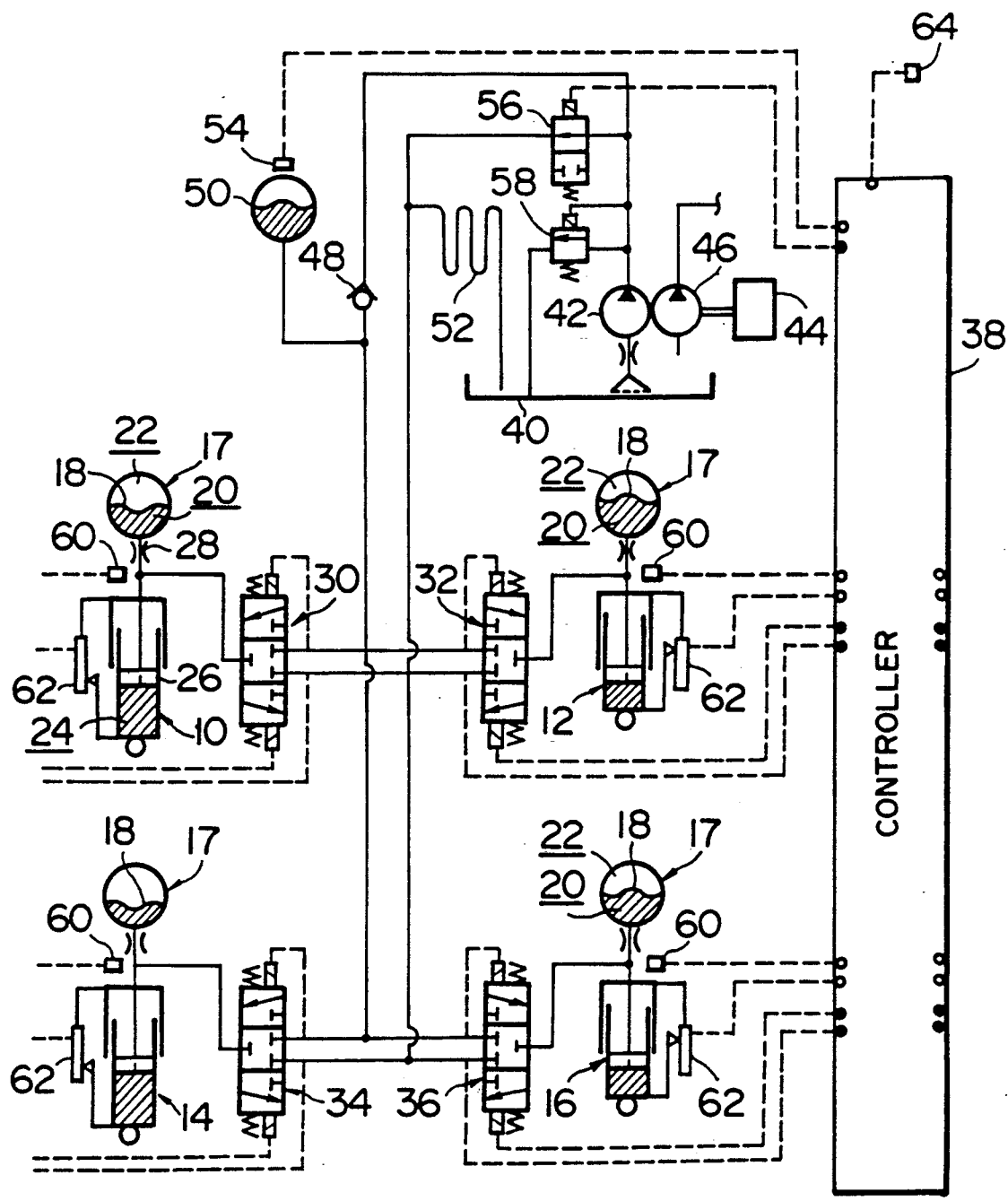
FIG. 1 is an illustration of an active suspension system, showing a fluid charging and discharging system.

FIG. 1 illustrates a control system of an active suspension system according to the present invention, adopting conventional hydro-pneumatic suspensions. In FIG. 1, reference numerals 10, 12, 14, 16 designate suspensions of a right front wheel, a left front wheel, a right rear wheel and a left rear wheel, respectively. Each of suspensions 10, 12, 14, 16 has a gas spring portion 17 having an interior thereof separated with a diaphragm 18 to define an oil chamber 20 and a sealed gas chamber 22. The oil chamber 20 is communicated to an oil chamber 24 of an oil cylinder 26 of the corresponding suspensions 10, 12, 14, 16 through an orifice 28, respectively. One end of each oil cylinder 26, for example a bottom thereof, is connected to a member of a corresponding wheel, and the other end, for example, a piston rod, is coupled to a member of a vehicle body. When a vertical load is applied, oil flows between the oil cylinder 26 and the gas spring portion 17 through the orifice 28 to generate an appropriate damping force while a volumetric elasticity of the gas which is sealed in the gas chamber 22 with the diaphragm 18 provides a spring effect.

Control valves 30, 32, 34, 36 are provided for supplying the oil to and discharging the oil from the oil chamber 24 of the oil cylinder 26 of the corresponding suspensions 10, 12, 14, 16. The control valves 30, 32, 34, 36 are independently controlled by a controller 38 which will be described hereinafter.

Reference numerals 40 and 42 respectively indicate an oil tank and an oil pump, which is actuated by an engine 44. In this embodiment, the oil pump 42 and an oil pump 46 for power steering are arranged in tandem and are simultaneously driven by the engine 44. The oil discharged from the oil pump 42 is accumulated in a high pressure accumulator 50 through a check valve 48. When one or more control valves 30, 32, 34, 36 are changed over to a charging side, high pressure oil is supplied to the oil chamber 24 of the corresponding suspensions 10, 12, 14, 16 through the control valves 30, 32, 34, 36 changed over. When one or more control valves 30, 32, 34, 36 are changed over to a discharging side, the oil is discharged from the oil chamber 24 of the corresponding suspensions 10, 12, 14, 16 through the control valves 30, 32, 34, 36 and returns to the oil tank 40 through an oil cooler 52. A pressure sensor 54 detects when the high pressure accumulator 50 reaches at a predetermined pressure and sends a signal to the controller 38, which in turn provides a signal to change over a load and unload valve 56 as shown, causing the discharged oil of the oil pump 42 to flow through the oil cooler 52 into the oil tank 40.

Each of the suspensions 10, 12, 14, 16 is provided with a vertical g sensor 60 for detecting a vertical acceleration of a spring mass and with a vertical relative displacement sensor or a suspension stroke sensor 62 for sensing a vertical relative displacement of the spring mass and unspring mass. Information on the vertical acceleration and the vertical relative displacement for each of the suspensions 10, 12, 14, 16 is inputted to the controller 38. A longitudinal g sensor 64 detects a longitudinal g of the vehicle body to feed a signal representing information on the longitudinal g to the controller 38.

Figure 2:
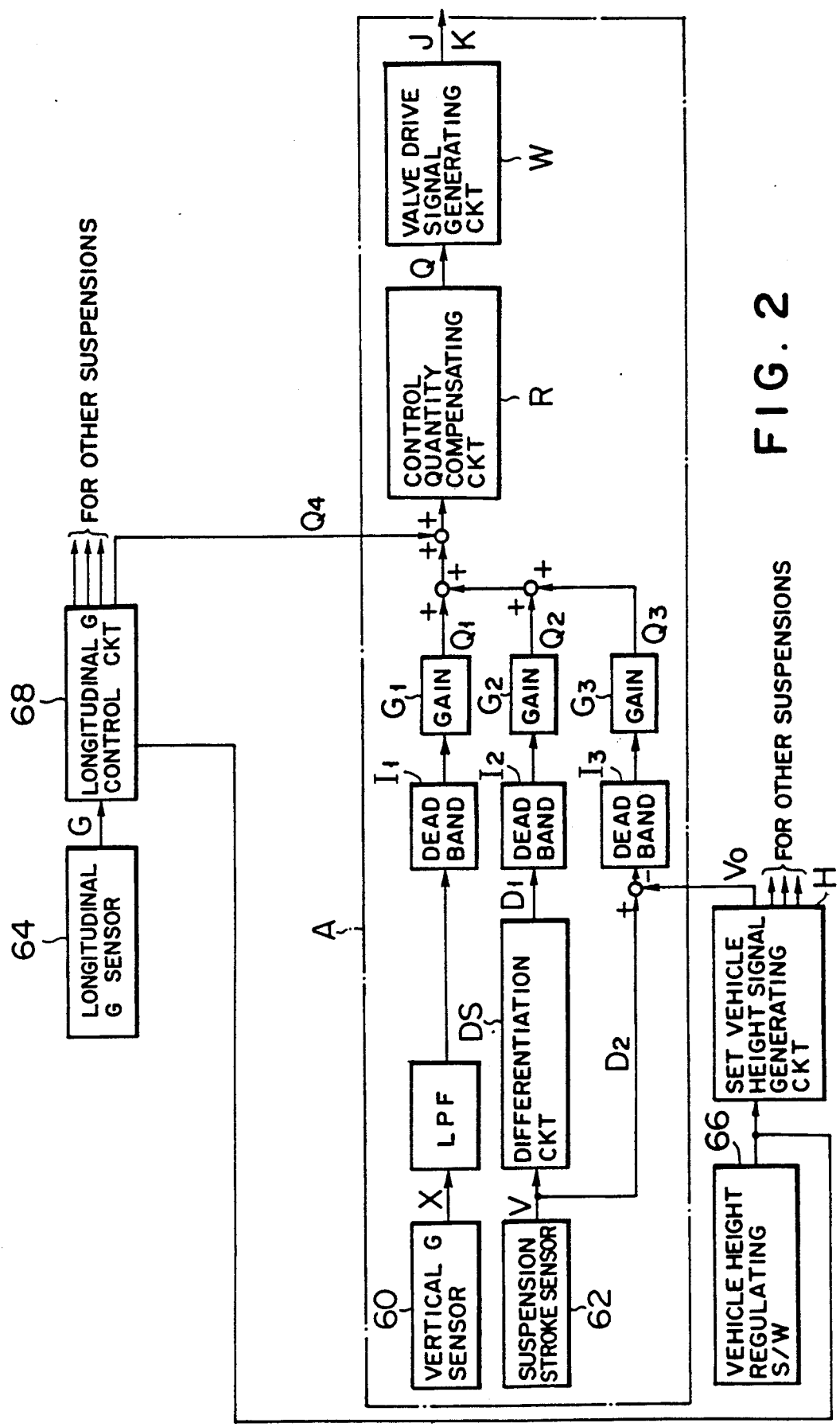
FIG. 2 is a control block diagram illustrating the controller in FIG. 1.

A control logic of the controller 38 will be described with reference to FIG. 2, in which the portion A boxed by the dot-dash line is a control block diagram of one of the suspensions 10, 12, 14, 16 the left front suspension 10 for example. Although only one control logic is shown, four control logics having the same control blocks as the portion A are provided for independent control of each of the suspensions 10, 12, 14, 16.

The vertical acceleration and the vertical relative displacement at the suspension 10 are detected by the vertical g sensor 60 and the vertical relative displacement sensor 62, respectively.

The vertical g sensor 60 feeds a vertical acceleration signal X representing the vertical acceleration to a low pass filter LPF to cut off a high frequency component and then the resulting signal passes through a dead band circuit I1 where a low frequency component in a set zone in the vicinity of zero is cut off from the resulting signal. Then, the resulting signal is multiplied by a gain G1 to obtain a control instruction quantity Q1 adapted to a characteristic of the corresponding control valve 30.

The vertical relative displacement sensor 62 feeds a vertical relative displacement signal V representing the vertical relative displacement to a differentiation circuit DS for producing a vertical relative displacement velocity signal D1. The vertical relative displacement velocity signal D1 passes through a dead band circuit I2, where a low frequency component in a set band in the vicinity of zero is eliminated. The resulting displacement velocity signal is multiplied by a gain G2 to produce a control instruction quantity Q2 which matches the characteristic of the corresponding control valve 30. On the other hand, a true vertical relative displacement signal D2 is obtained by subtracting a set vehicle height signal Vo from the vertical relative displacement signal V, the set vehicle height signal Vo being instructed through a set vehicle height signal generating circuit H by a vehicle height regulating switch 66. The true vertical relative displacement signal D2 passes through a dead band circuit I3 where a low frequency component of a set band in the vicinity of zero is eliminated, and then the resulting signal is multiplied by a gain G3 to give a control instruction quantity Q3 which matches the characteristic of the corresponding control valve 30.

When the control valves 30, 32, 34 and 36 are flow control valves, the three control instruction quantities Q1, Q2 and Q3 which match the characteristic of the corresponding control valve means a valve opening instruction time of the charging side or the discharging side thereof. A time signal is converted from an amount of oil which should be charged or discharged in view of the control valve characteristic.

The three control instruction quantity Q1, Q2 and Q3 are added and then the resulting quantity signal is transmitted to a control quantity compensation circuit R where the signal is converted to a compensated instruction quantity Q in view of environmental conditions such as a temperature and a pressure loss due to differences in a length of conduits. The compensated instruction quantity Q is fed to a valve control signal generating circuit W, which accordingly generates a control valve opening signal J or a control valve closing signal K, according to which the control valve 30 is changed over to the charging side or the discharging side, so that charging of the oil into or discharging of the oil out of the suspension 10 is carried out at the instruction quantity.

In the control based on the vertical acceleration, the oil is discharged from the suspension 10 against an upward acceleration whereas the oil is charged into the suspension 10 against a downward acceleration. Thus, this control provides a suspension characteristic which is soft and high damping effect against an upward force such as a thrust from the road surface, and on the other hand, to a downward force from the vehicle body the control gives an apparently rigid or stiff suspension characteristic to maintain a vehicle height at a set level in cooperation with a control based on both the vertical relative displacement velocity and the vertical relative displacement which control charging and discharging of the oil to maintain the set vehicle height. The control is executed responsive to a vibration of a low frequency zone in the vicinity of a spring resonance frequency without responding much to a vibration of a high frequency zone, such as an unspring resonance frequency by passing the vertical acceleration signal through the low-pass filter, so that the control has priority to a bouncing.

The vehicle height regulating switch 66 is a change-over switch which is changed over, for example, between a normal vehicle height side and a high vehicle height side. When the normal vehicle height is selected, the vehicle height signal generating circuit H generates a set low vehicle height signal Vo, and when the vehicle height regulating switch 66 is switched to the high vehicle height side, the vehicle height signal generating circuit H generates a set high vehicle signal Vo.

The longitudinal g sensor 64 gives a longitudinal g signal G to a longitudinal g control circuit 68 which is made up of an inertia moment calculating circuit 90 for calculating a moment of inertia in acceleration and deceleration, a drive reaction force moment calculating circuit 96 for calculating a moment of a drive reaction force, a braking force moment calculating circuit 94 for calculating a moment of a braking force, control quantity calculating circuit 106 and the like circuit. In response to the longitudinal g signal G, the longitudinal g control circuit 68 calculates an oil charge/discharge instruction quantity Q4 for each of the suspensions 10, 12, 14, 16 according to the block diagram shown in FIG. 3. The calculated result Q4 is added to the control instruction quantity Q1, Q2 and Q3 and then the resulting quantity is inputted to the control quantity compensating circuit R.

When the longitudinal g is generated on the vehicle body in braking or acceleration thereof, a shift of a load in the fore or aft direction occurs by an inertia force which is exerted on the center of gravity of the vehicle body. When the vehicle is braked, the front suspensions 10 and 12 contract whereas the rear suspensions 14 and 16 extend (nosedive). When accelerated, the front suspensions 10 and 12 extend and the rear suspensions 14 and 16 contract (squat). The contraction and extension of the suspensions 10, 12, 14, 16 depend upon differences in the type of suspensions and upon whether suspensions are for driving wheels or driven wheels.

Figure 4:
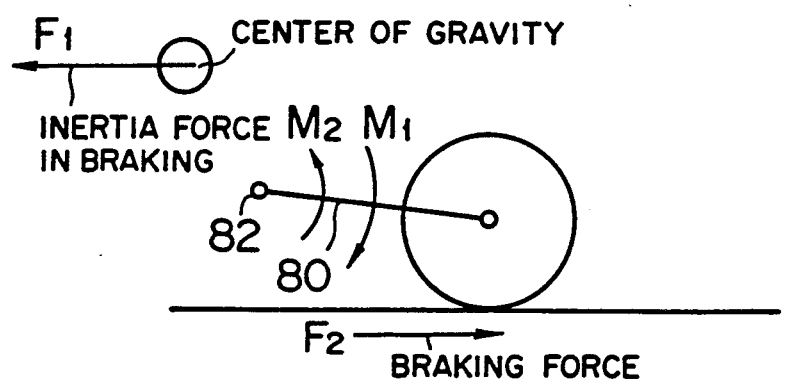
FIG. 4 is a diagrammatic view illustrating moments generated on a rear wheel suspension arm in braking.

More specifically, in applying a braking force F2 as in FIG. 4, a moment M1 about the center 82 of pivotal movement of each suspension arm 80 is generated due to the load shift in the fore and aft direction whilst a moment M2 due to the braking force F2 is applied to the suspension arm 80 since a reaction force against the braking force is exerted on a bearing of the suspension arm 80. A change in the stroke of each suspension arm 80 with the moments M1 and M2 in the same direction is larger than a change in the stroke thereof with opposite moments M1 and M2. The moment M2 due to the braking force F2 depends upon the type of the suspension. In case of the rear wheel suspension of a semi-trailing arm type, the moment M2 caused by the braking force F2 is relatively large and opposite to the moment M1 due to the inertia force F1 in braking as in FIG. 4, and thus both moments M1 and M2 are canceling each other so that lifting of the rear portion of the vehicle body is prevented.

Figure 5A:
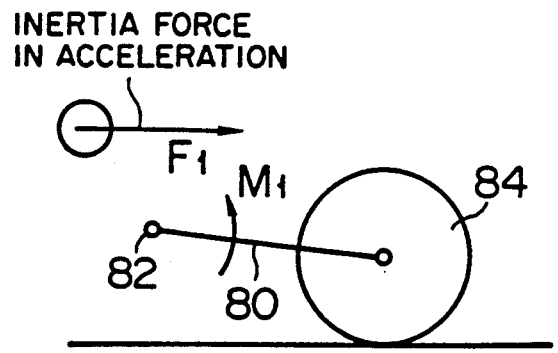
FIG. 5A is a diagrammatic view illustrating a moment generated on a rear driven wheel suspension arm in acceleration of a vehicle.
Figure 5B:
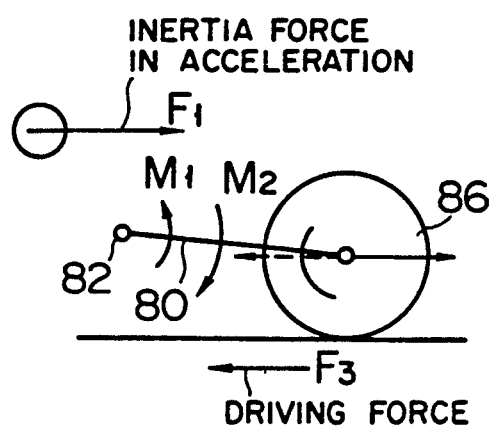
FIG. 5B is a diagrammatic view illustrating moments generated on a rear drive wheel suspension arm in acceleration of a vehicle.

In acceleration of the vehicle, a rearward inertia force F1 generates a moment M1 which tends to contract the rear suspensions as illustrated in FIGS. 5A and 5B. When the rear wheels are driven wheels, only the moment M1 is applied to each suspension arm 80 of the rear wheels as in FIG. 5A. When the rear wheels are driving wheels, a driving force F3 is applied to each suspension arm 80 of the rear wheels to generate a moment M2 which is opposite to the moment M1, so that the moments M1 and M2 cancel each other to prevent dives of the rear wheels.

Figure 3:
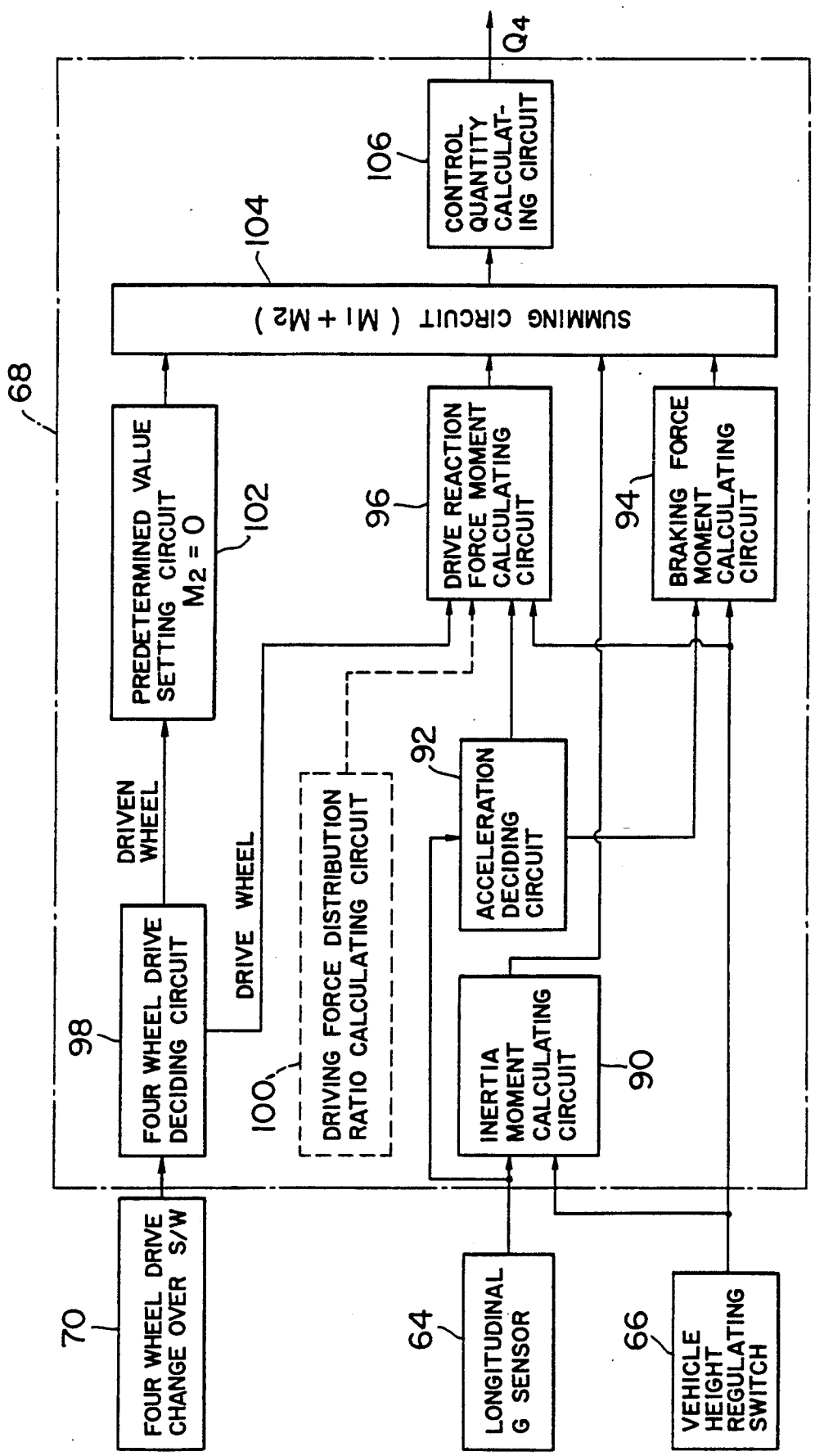
FIG. 3 is a block diagram of the longitudinal g control circuit in FIG. 2.

The longitudinal g control circuit is described in detail in FIG. 3. When the longitudinal g signal G is outputted from the longitudinal g sensor 64, the inertia moment calculating circuit 90 calculates the moments M1 of each of front and rear suspension arms 80 about the center 82 of the pivotal movement thereof from the longitudinal g signal G according to a previously stored specification of the vehicle, and a height of the center of gravity of the vehicle body which is given by a vehicle height signal from the vehicle height regulating switch 66. Then, an acceleration deciding circuit 92 decides whether the vehicle is accelerated or decelerated responsive to the longitudinal g signal G. In case of the deceleration, the moment M2 of each of front suspensions and rear suspensions is calculated in the braking force moment calculating circuit 94 from both the breaking force of each suspension calculated based on a braking force distribution between front and rear wheels and a height of the center 82 of the pivotal movement of each suspension arm 80 according to previously stored information of the type of suspensions, the height of the center 82 being given from the vehicle height signal from the vehicle height regulating switch 66. In case of acceleration of a part-time four wheel drive vehicle, whether it is in a two wheel drive mode or in a four wheel drive mode is decided in a four wheel drive deciding circuit 98 responsive to a signal from a four wheel drive change-over switch 70. When the vehicle is in the two wheel drive mode, the moment M2 due to a drive reaction force in driven wheels 84 is determined as zero in a predetermined value setting circuit 102 whereas the moment M1 due to a drive reaction force in drive wheels 86 is calculated in the drive reaction force moment calculating circuit 96 from the driving force F1 and the height of the center 82 of the pivotal movement of each of drive wheel suspension arms, the height of the center 82 being obtained from the vehicle height signal of the vehicle height regulating switch 66. In case of the four wheel drive mode, the moment M2 of a distributed drive reaction force according to a front and rear distribution ratio of the driving force is calculated for each of front and rear suspensions in a driving force distribution ratio calculating circuit 100.

The moment M1 due to the inertia force F1 and moments M2 due to the braking force F2 or the driving force are added in a summing circuit 104 to produce an added moment (M1+M2) signal, and then in the control quantity calculating circuit 106, a suspension reaction force component which cancels a vertical force according to the added moment (M1+M2) is calculated, and furthermore, with respect to each suspension the oil charge/discharge instruction quantity Q4 is calculated, the quantity being needed to produce suspension inner pressure, corresponding to the suspension reaction force component, for holding a desired position of the vehicle. The control quantity calculating circuit 106 thus provides a control signal representing the oil charge/discharge instruction quantity Q4 to the control quantity compensation circuit R.

A hysteresis circuit or a dead band circuit may be provided to an input circuit which transmits the longitudinal g signal to the longitudinal g control circuit 68 so that the control of the active suspension system is carried out only when pitching of the vehicle is large as in full and large acceleration or moderate braking, without responding to ordinary acceleration and deceleration which are repeated during driving of the vehicle. For detecting the braking force which is an element for calculation of the moment M2, there may be provided means for calculating the braking force from a signal given by a braking pedal stroke sensor or a braking oil pressure sensor. The driving force as another element for calculating the moment M2 may be calculated from an engine speed which is detected by an engine speed sensor and a gear ratio which is sensed by a gear ratio sensor in the transmission (coefficient of friction $\mu$ on a road surface is considered substantially a constant). When such a control is performed only in moderate or hard braking of the vehicle as described above, the braking force may be set substantially constant and the moment M2 may be calculated by taking only the front and rear distribution ratio of the braking force. In case where the control is carried out in full acceleration of the vehicle, the driving force may be set substantially constant and the moment M2 may be calculated based on the gear ratio to determine a total driving force and the front and rear distribution ratio of the driving force. When a device for performing variable control of the front and rear distribution ratio of the driving force is used, the ratio is detected responsive to a control signal representing the front and rear distribution ratio of the driving force from that device.

In this embodiment, a change in the position of the vehicle in a pitching direction is estimated from longitudinal g of the vehicle. The suspension reaction force variation of each suspension is calculated by adding the moment M1 due to the inertia force of the vehicle, which can be calculated from the longitudinal g, to the moment M2 about the center 82 of the pivotal movement of each suspension arm 80 due to the braking force or the drive reaction force in consideration of nose-dive and squat characteristics of the type of suspensions. The oil charge and discharge control is carried out to correspond to the suspension reaction force variation. Thus, a highly accurate control of the vehicle position is achieved with a very small time lag.

Although in the embodiment, the active suspension system is provided with both the vertical acceleration detecting means and the vertical relative displacement detecting means, the present invention may be applied to a system which has only the vertical relative displacement detecting means, and in which charging and discharging of a liquid or a gas is independently controlled for each of the suspensions to respond to the vertical relative displacement.

While the preferred embodiment of the present invention has been shown and described, it is to be understood that this disclosure is for the purpose of illustration and that various changes and modifications may be made without departing from the scope of the invention as set forth in the appended claims.

What is claimed is:

1. A control unit for an active suspension system of a vehicle having a plurality of suspension units adapted to corresponding wheels and supporting a vehicle body by pressure of a fluid, each suspension unit including a suspension arm adapted to connect to the vehicle body for vertical pivotal movement about a pivotal center, the active suspension system having vertical relative displacement sensing means for sensing the vertical relative displacement between masses above and below each suspension unit to generate a vertical relative displacement signal, vertical g sensing means for sensing vertical acceleration of the vehicle body to generate a vertical g signal, fluid charging and discharging means for selectively charging the fluid into and discharging the fluid from each suspension unit, first control instruction quantity calculating means for calculating first control instruction quantity of the fluid to be charged into and discharged from each suspension unit in response to the vertical relative displacement signal and the vertical g signal and for producing a first control instruction quantity signal representing the first control instruction quantity and fluid charge and discharge control means responsive to the first control instruction quantity for producing a control signal to the fluid charging and discharging means, the improvement which comprises:

longitudinal g sensing means for sensing longitudinal acceleration of the vehicle body to generate a longitudinal g signal;

first moment calculating means for calculating a first moment about the pivotal center of each suspension arm due to the inertia force of the vehicle body from said longitudinal g signal and a set vehicle height signal;

first deciding means for deciding whether the vehicle is accelerated or decelerated to generate a decision signal indicating one of both acceleration and deceleration of the vehicle;

second moment calculating means for calculating a second movement about the pivotal center of each suspension arm due to the braking force exerted on the vehicle and the set vehicle height signal when the decision signal indicates deceleration of the vehicle and for calculating the second movement about the pivotal center of each suspension arm with respect to a corresponding drive wheel due to a drive reaction force against a driving force exerted to the vehicle and the set vehicle height signal when the decision signal indicates acceleration;

suspension reaction force variation calculating means for calculating the suspension reaction force variation for each suspension unit from the first and second moments to generate a suspension reaction force variation signal representing the suspension reaction force variation;

control instruction quantity calculating means for calculating a second control instruction quantity of the fluid to be charged into and discharged from each suspension unit in response to the suspension reaction force variation to generate a control instruction quantity signal; and summing means responsive to the first and second control instruction quantity signal for adding the first control instruction quantity to the second control instruction quantity and for producing a total control instruction quantity to the fluid charge and discharge control means, wherein the total control instruction quantity of the fluid controls the vehicle body in the normal position.

2. A control unit as recited in claim 1, wherein;

the vehicle is a part-time four wheel drive vehicle,
the second moment calculating means comprises second deciding means for deciding whether the vehicle is in a four wheel drive mode or in a two wheel drive mode
and the second moment calculating means calculates the second moment about the pivotal center of each suspension arm with respect to a corresponding drive wheel due to the drive reaction force against a driving force exerted to the vehicle and the set vehicle height signal while the second movement about the pivotal enter of each suspension arm with respect to a corresponding driven wheel is set to zero, in the two wheel drive mode, and
calculates the second movement due to a drive reaction force distributed to each drive wheel corresponding to a set driving force distribution ratio for each suspension unit in the four wheel drive mode when the decision signal indicates acceleration.

3. A component for a control unit for an active suspension system of a vehicle, having a plurality of suspension units adapted to corresponding wheels and supporting a vehicle body by pressure of a fluid and fluid charging and discharging means for selectively charging the fluid into and discharging the fluid from each suspension unit, each suspension unit including a suspension arm adapted to connect to the vehicle body for vertical pivotal movement about a pivotal center, the improvement which comprises:

longitudinal g sensing means for sensing longitudinal acceleration of the vehicle body;
first moment calculating means responsive to the longitudinal acceleration and a set vehicle height for calculating a first moment about the pivotal center of each suspension arm due to the inertia force of the vehicle body;
deciding means for deciding whether the vehicle is in an accelerating state or decelerating state;
second moment calculating means for calculating a second movement about the pivotal center of each suspension arm due to the braking force exerted on the vehicle and the set vehicle height in the decelerating state and for calculating the second movement about the pivotal center of each suspension arm with respect to a corresponding drive wheel due to a drive reaction force against a driving force exerted to the vehicle and the set vehicle height in the accelerating state;
suspension reaction force variation calculating means responsive to the first and second moments for calculating a suspension reaction force variation for each suspension unit; and
control instruction quantity calculating means responsive to the suspension reaction force variation for calculating a control instruction quantity of the fluid to be charged into or discharged from each suspension unit.

4. A control unit for an active suspension system of a vehicle, having a plurality of suspension units adapted to corresponding wheels and supporting a vehicle body by pressure of a fluid and fluid charging and discharging means for selectively charging the fluid into and discharging the fluid from each suspension unit, each suspension unit including a suspension arm adapted to connect to the vehicle body for vertical pivotal movement about a pivotal center, the active suspension system having vertical relative displacement between masses above and below each suspension unit to generate a vertical relative displacement signal, vertical g sensing means for sensing vertical acceleration of the vehicle body to generate a vertical g signal, first control instruction quantity calculating means for calculating first control instruction quantity of the fluid to be charged into and discharged from each suspension unit in response to the vertical relative displacement signal and the vertical g signal and for producing a first control instruction quantity signal representing the first control instruction quantity, the improvement which comprises:

longitudinal g sensing means for sensing longitudinal acceleration of the vehicle body;
first moment calculating means responsive to the longitudinal acceleration and a set vehicle height for calculating moment about the pivotal center of each suspension arm due to the inertia force of the vehicle body;
deciding means for deciding whether the vehicle is in an acceleration state or decelerating state;
second moment calculating means for calculating second movement about the pivotal center of each suspension arm due to the braking force exerted on the vehicle and the set vehicle height in the decelerating state and for calculating the second movement about the pivotal center of each suspension arm with respect to a corresponding drive wheel due to a drive reaction force against a driving force exerted to the vehicle and the set vehicle height in the accelerating state;
suspension reaction force variation calculating means responsive to the first and second moments for calculating a suspension reaction force variation for each suspension unit;
control instruction quantity calculating means responsive to the suspension reaction force variation for calculating a control instruction quantity of the fluid to be charged into or discharged from each suspension unit; and
fluid control means responsive to the control instruction quantity for producing a control signal to the fluid charging and discharging means, wherein the control instruction quantity of the fluid controls the vehicle body in the normal position.

5. The component according to claim 3, wherein the vehicle is a part-time four wheel drive vehicle, the second moment calculating means comprises second deciding means for deciding that the vehicle is in a two wheel drive mode and predetermined value setting means for setting the second moment of the driven wheel to zero in said two wheel drive mode, and the second moment calculating means calculates the second movement of the drive wheel due to the drive reaction force against the driving force exerted to the vehicle and the set vehicle height in said two wheel drive mode.

6. The component according to claim 3, wherein the vehicle is a part-time four wheel drive vehicle, the second moment calculating means comprises second deciding means for deciding that the vehicle is in a four wheel drive mode and the second moment calculating means calculates the second moment of all of the drive wheels due to the drive reaction force against the driving force exerted to the vehicle and the set vehicle height in said four wheel drive mode.

7. The component according to claim 3, wherein the vehicle is a four wheel drive vehicle in which a front and rear distribution ration of the driving force is comprises distribution ratio calculating means for calculating the front and rear distribution ratio of the driving force, and the second moment calculating means calculates the second moment of the drive wheel due to the set vehicle height and the drive reaction force against the driving force upon the front and rear distribution ratio.

8. The Component according to claim 3, further comprising:

suspension stroke sensor for sensing a suspension stroke of each suspension unit;

differentiation means for differentiating said suspension stroke to provide a second control instruction quantity;

vehicle height regulating switch provided to select the set vehicle height;

vehicle height setting means responsive to output from the vehicle height regulating switch for setting a reference vehicle height;

computing means for calculating a difference between the suspension stroke and the reference vehicle height to provide a third control instruction quantity;

vertical g sensor for sensing a vertical acceleration of the vehicle body;

setting means for setting a fourth control instruction quantity in response to the vertical acceleration; and adding means for adding the first, second, third and fourth control instruction quantities to provide a total quantity which is supplied to the fluid control means.

9. The control unit according to claim 1, wherein said first control instruction quantity calculating means comprises:

differentiation means for differentiating said vertical relative displacement signal to provide a first control amount;

a vehicle height regulating switch provided to select the set vehicle height;

vehicle height setting means responsive to output from the vehicle height regulating switch for setting a reference vehicle height;

means for calculating a difference between the vertical relative displacement signal and the reference vehicle height to provide a second control amount;

means for setting a third control amount in response to the vertical g signal; and adding means for adding the first, second and third control amounts to provide the first control instruction quantity.

* * * * *